G. C. HALE.
WAVE MOTOR.
APPLICATION FILED SEPT. 14, 1908.

916,860.

Patented Mar. 30, 1909.
2 SHEETS—SHEET 1.

Witnesses
C. H. Walker.
Ernest R. Hutchinson

Inventor
George C. Hale
By Edson Bros
Attorneys

G. C. HALE.
WAVE MOTOR.
APPLICATION FILED SEPT. 14, 1908.

916,860.

Patented Mar. 30, 1909.
2 SHEETS—SHEET 2.

Witnesses
C. M. Walker
Ernest F. Hutchinson

Inventor
George C. Hale,
By Edson Bro's
Attorneys

UNITED STATES PATENT OFFICE.

GEORGE C. HALE, OF KANSAS CITY, MISSOURI.

WAVE-MOTOR.

No. 916,860.  Specification of Letters Patent.  Patented March 30, 1909.

Application filed September 14, 1908. Serial No. 452,855.

*To all whom it may concern:*

Be it known that I, GEORGE C. HALE, a citizen of the United States, residing at Kansas City, in the county of Jackson and State of Missouri, have invented certain new and useful Improvements in Wave-Motors; and I do hereby declare the following to be a full, clear, and exact description of the invention, such as will enable others skilled in the art to which it appertains to make and use the same.

My invention relates to wave motors designed to utilize the force of the waves which beat upon the shores of the ocean.

It has for its object to produce a motor of this kind which will be thoroughly practical, durable and efficient. It is also simple in construction and may be economically built and operated. Unlike most wave motors, a storm will not put it out of commission but will accelerate its action and increase its efficiency.

The invention consists broadly in placing a swinging wing in such relation to a chambered bulk-head that the force of a wave will close said wing upon an opening in said bulk head and the flow of the water as it recedes after the wave will operate to open said wing to a position to receive the impact of the next wave.

The invention consists further in the features of construction and combinations of devices hereinafter described and specified in the claims.

Figure 1:
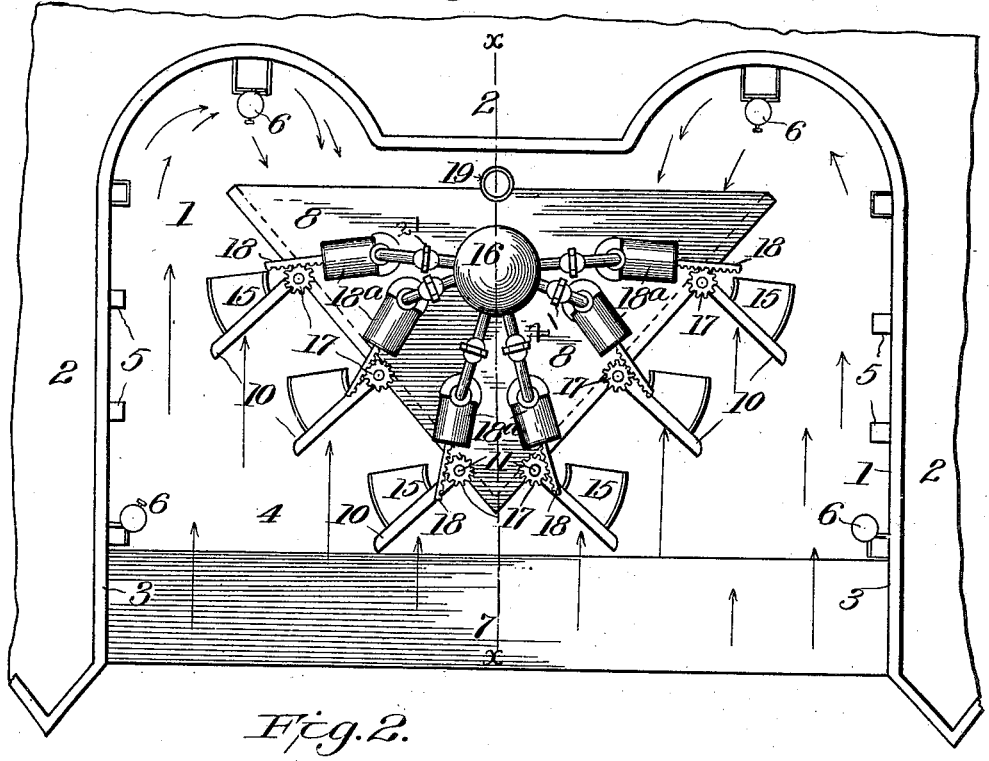
Figure 2:
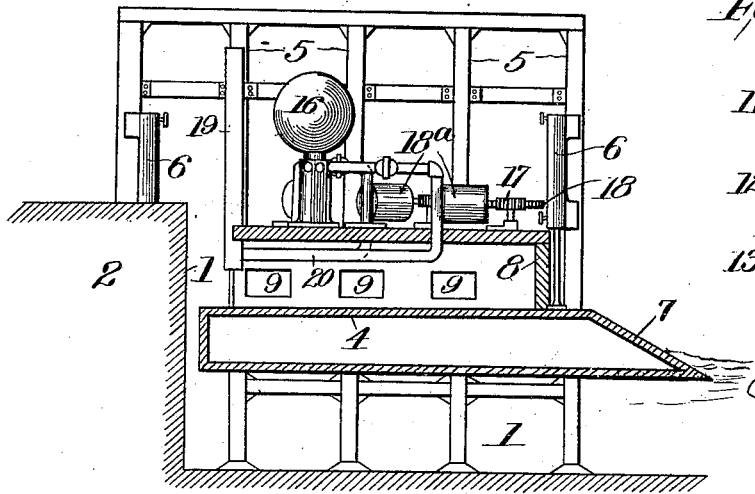
Figure 3:
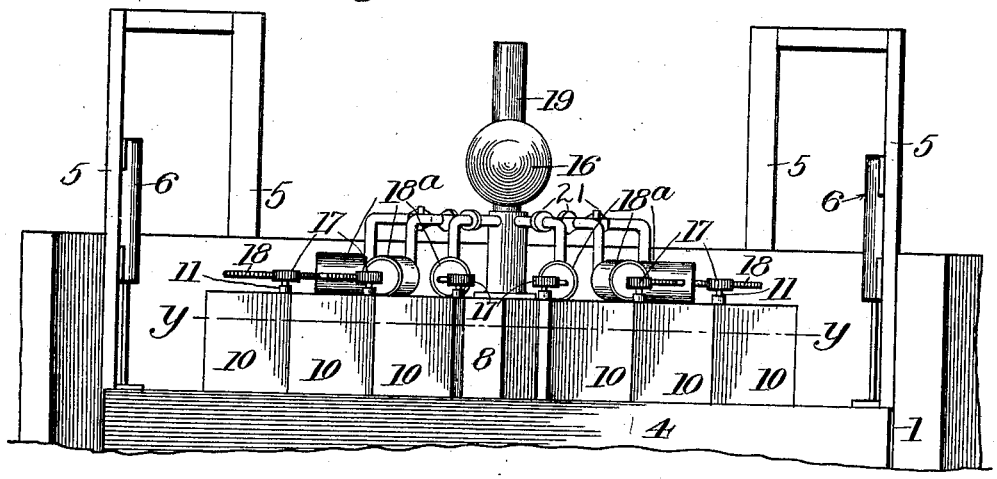
Figure 4:
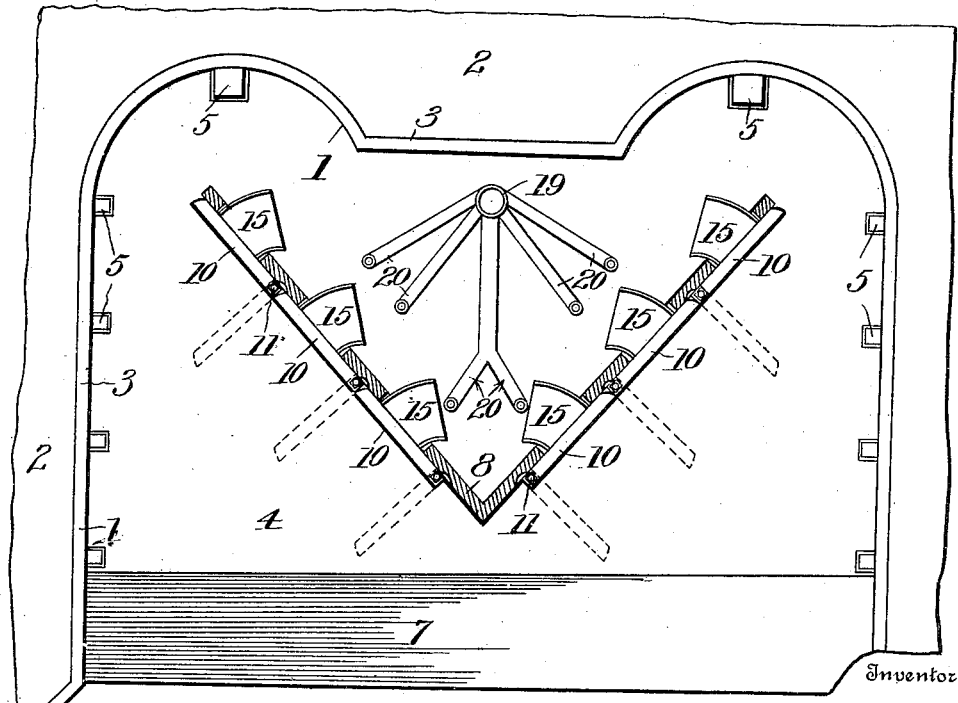

In the accompanying drawings, illustrating the preferred embodiment of my invention: Figure 1 is a plan view of one of my motors in operative position, the wings being open. Fig. 2 is a vertical sectional view on the line x—x of Fig. 1. Fig. 3 is a front elevation showing the wings closed. Fig. 4 is a horizontal sectional view on the line y—y of Fig. 3, and Fig. 5 is a detailed view of one of the wings and the vertical shaft or standard on which it is mounted.

Referring more particularly to the drawings, in carrying out my invention I place the motor in a cradle 1, preferably formed in the end of a pier 2 constructed of masonry or other suitable material. The cradle is lined with sheet metal 3 as indicated in Fig. 1. The operating parts of the motor are mounted upon a float or platform 4 which is vertically adjustable in the cradle. Said platform is guided upon uprights 5 and is preferably adjusted and retained in the desired position by hydraulic jacks 6, the cylinders of which are bolted to the uprights while the ends of their piston rods are suitably fastened to the floor of the platform. The intention is to place the apparatus at the most convenient position from the shore to take advantage of the velocity of the waves at different stages of the tide. The jacks prevent any rocking motion of the float while receiving the flow of water necessary to operate the motor. The outer end of the platform is inclined as at 7 to quickly carry off the water as it recedes.

A chambered bulk-head 8 is constructed upon the platform in the form of the letter V with its point or apex extending outward. Said bulk-head is closed on the top and also on the sides except for a number of openings 9 which are adapted to be closed by the wings 10. The rear end of the bulkhead is left open and does not extend all the way back to the rear wall of the cradle. Each of the wings, of which there may be any desired number, preferably equally divided on the two sides of the V-shaped bulk-head, is mounted to swing upon a vertical shaft or standard 11 from an open position at substantially right angles to the side of the bulk-head to which it is pivoted to a position parallel to and flat against said side. In the latter closed position the wing covers the corresponding opening 9.

Figure 5:
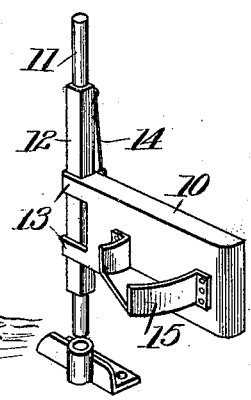

As illustrated in Fig. 5, the standard 11 is formed with a square shank 12 and the wing is provided with angular loops 13 fitted around it whereby said wing has vertical movement with respect to the standard without being able to turn independently thereof. A chain 14 or other suitable flexible connection serves to hold the wing at the proper position on the standard. A pocket 15 preferably of sheet metal is fastened to the inner face of the wing and is preferably curved or arcuate in shape to correspond with the arc of movement of said wing. Said pocket is closed at both sides but is left open at its inner edge, the purpose of which will be hereinafter explained.

Any suitable means may be employed for transmitting motion from the standard 11. In the embodiment of the invention which I have illustrated in the accompanying drawing I use air compressors, one being driven by each of the standards 11 and all of which deliver to a common air receiver 16. Each of said standards carries a gear wheel 17 on its upper end which is adapted to mesh with a rack 18 formed on the piston rod of the compressors 18ª. Air is preferably supplied to the compressors through a feed pipe 19 extending from above down behind the bulk-head and spreading into branch pipes 20 leading to the several compressors. The air which is compressed and forced into the receiver is retained therein by check valves 21 arranged in the pipes connecting the compressors and the receiver. Said compressors are single acting, the positive strokes being made when the wings are closed.

Fig. 1 shows the operative position of the wings before they are struck by a wave. When a wave enters the cradle moving in the direction of the arrows in this figure, it will turn said wings from an open to a closed position and the resulting partial rotation of the standards 11 will operate the compressors which will deliver compressed air to the receiver. When the wings close their pockets enter the openings 9 in the side of the bulk-head while said wings themselves cover these openings. When the wave has operated and passed the wings it is arrested or breaks against the rear wall of the cradle and as it flows back or recedes it enters the rear open end of the bulk-head and in its endeavor to escape forces open the wings and returns them to their operative position in readiness to be again actuated by the next wave. The water in its rebound to seek its level fills the pockets 15 and by the swinging motion of the wings and the freedom for the water to empty from said pockets, at their open inner edges, said wings are given a powerful start outward and by the time they reach the proper angle to receive the impact of the next wave the pockets are emptied.

The compressed air stored in the receiving tank may be used to drive compressed air motors which in turn run an electric dynamo whereby electricity may be generated continuously and at a much less cost than has heretofore been possible.

I am aware that minor changes may be made in the construction shown and described herein without departing from the spirit or sacrificing the advantages of my invention. I, therefore, do not limit myself to the forms and constructions herein explained.

I claim:

1. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber.

2. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, and a pocket on the inner face of said wing for the purpose specified.

3. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, and a pocket secured to the inner face of said wing and open at its inner edge for the purpose specified.

4. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard on which said wing is mounted and means to transmit motion from said standard.

5. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard on which said wing is mounted, means whereby said wing may adjust itself vertically on said shaft without turning independently thereof, and means to transmit motion from said standard.

6. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard on which said wing is mounted, means whereby said wing may adjust itself vertically on said shaft without turning independently thereof, means to transmit motion from said standard and a pocket secured to the inner face of said wing for the purpose specified.

7. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard having its shank angular in cross-section, said wing having an angular loop fitting around said shank, flexible connection for holding said wing normally in proper position on said standard and means to transmit motion from said standard.

8. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard on which said wing is mounted, a gear wheel on said standard, and an air compressor having a rack on its piston rod meshing with said gear wheel.

9. In a wave motor, the combination, with a chambered bulk-head having an opening therein, of a swinging wing adapted to close said opening when turned under the impact of a wave, the chamber in said bulk-head being open to the flow of the water as it recedes whereby said wing is opened by said water seeking an escape from said chamber, a rotatable standard on which said wing is mounted, a gear wheel on said standard, an air compressor having a rack on its piston rod meshing with said gear wheel, means to feed air to said compressor from above the water whereby there is no danger of moisture or spray entering its cylinder, and a storage receptacle for the compressed air.

10. In a wave motor, the combination, with a V-shaped chambered bulk-head arranged with its apex pointing outward and having openings in its sides, of swinging wings, each adapted to close one of said openings when turned under the impact of a wave, the rear end of said bulk-head being open to the flow of the water as it recedes whereby said wings are opened by said water seeking an escape from said chamber.

11. In a wave motor, the combination, with a vertically adjustable platform having a sloping portion, of a V-shaped chambered bulk-head arranged on said platform with its apex pointing outward and having openings in its sides, swinging wings each adapted to close one of said openings when turned under the impact of a wave, the rear end of said bulk-head being open to the flow of the water as it recedes whereby said wings are opened by said water seeking an escape from said chamber.

12. In a wave motor, the combination, with a pier having a cradle formed in its end, of a vertically adjustable platform fitted closely in said cradle, a V-shaped chambered bulk-head arranged on said platform with its apex pointing outward and having openings in its sides, swinging wings each adapted to close one of said openings when turned under the impact of a wave, the rear end of said bulk-head being open to the flow of the water as it recedes whereby said wings are opened by said water seeking an escape from said chamber.

In testimony whereof I affix my signature, in presence of two witnesses.

GEORGE C. HALE.

Witnesses:
CHAS. T. WHEDON,
L. F. ROLLINS.